(12) United States Patent
Page et al.

(10) Patent No.: US 6,568,632 B2
(45) Date of Patent: May 27, 2003

(54) VARIABLE SIZE BLENDED WING BODY AIRCRAFT

(75) Inventors: Mark A. Page, Cypress, CA (US); Jennifer P. Whitlock, Huntington Beach, CA (US); Matthew W. Wilks, Lakewood, CA (US)

(73) Assignee: The Boeing Company, Chicago, IL (US)

( * ) Notice: Subject to any disclaimer, the term of this patent is extended or adjusted under 35 U.S.C. 154(b) by 121 days.

(21) Appl. No.: 09/826,031

(22) Filed: Apr. 4, 2001

(65) Prior Publication Data

US 2002/0145075 A1 Oct. 10, 2002

(51) Int. Cl.$^7$ .................................................. B64C 3/00
(52) U.S. Cl. ........................................ 244/36; 244/120
(58) Field of Search ............................ 244/36, 120, 13, 244/119

(56) References Cited

U.S. PATENT DOCUMENTS

| | | | |
|---|---|---|---|
| 3,761,041 A | 9/1973 | Putman | 244/13 |
| 5,082,204 A | 1/1992 | Croston | 244/126 |
| 5,813,628 A | 9/1998 | Hahl | 244/36 |
| 5,909,858 A | 6/1999 | Hawley | 244/36 |
| 5,975,464 A * | 11/1999 | Rutan | 244/118.2 |
| 6,065,720 A * | 5/2000 | Ash et al. | 244/118.2 |
| 6,070,831 A * | 6/2000 | Vassiliev et al. | 244/117 R |
| 6,098,922 A | 8/2000 | Hahl | 244/36 |
| 6,129,308 A | 10/2000 | Nastasi et al. | 244/36 |

OTHER PUBLICATIONS

Article entitled: The Blended–Wing Body, Nasa Facts FS–1997–07–24–LaRc, Jul. 1997.
Article entitled: Blended Wing Body (BWB), Aug. 7, 2002, from Boeing website: http://www.boeign.com/phantom/bw-b.html.
Article entitled: Evolution of the Blended–Wing–Body Subsonic Transport, Aug. 7, 2002 from website: http://www.galcit.caltech.edu/Seminars/Fluids/CurrentFluids/Liebeck_abs.html.

* cited by examiner

Primary Examiner—J. Woodrow Eldred
(74) Attorney, Agent, or Firm—Harness Dickey & Pierce P.L.C.

(57) ABSTRACT

A blended wing body aircraft having a modular body. In one embodiment, the configuration or cargo capacity of the aircraft can be varied by adding or subtracting intermediate body structures rather than by adding or subtracting segments from the lateral sides of the aircraft body. Configuration in this manner preserves key aerodynamic parameters and permits several major components to be used in several aircraft configurations, each of which having a different cargo capacity. In another embodiment, the aircraft is formed from a plurality of laterally-extending body structures. Changes to the cargo capacity of the aircraft is accomplished through the employment of body structures that are wider or narrower. Configuration in this manner provides the aircraft with a structure that is relatively strong and efficient. While the body structures of this embodiment are not shared across a family of variously sized aircraft, the base design of the body structures is readily modifiable to adjust for an increase or decrease in width associated with a desired change to the aircraft's cargo capacity.

47 Claims, 11 Drawing Sheets

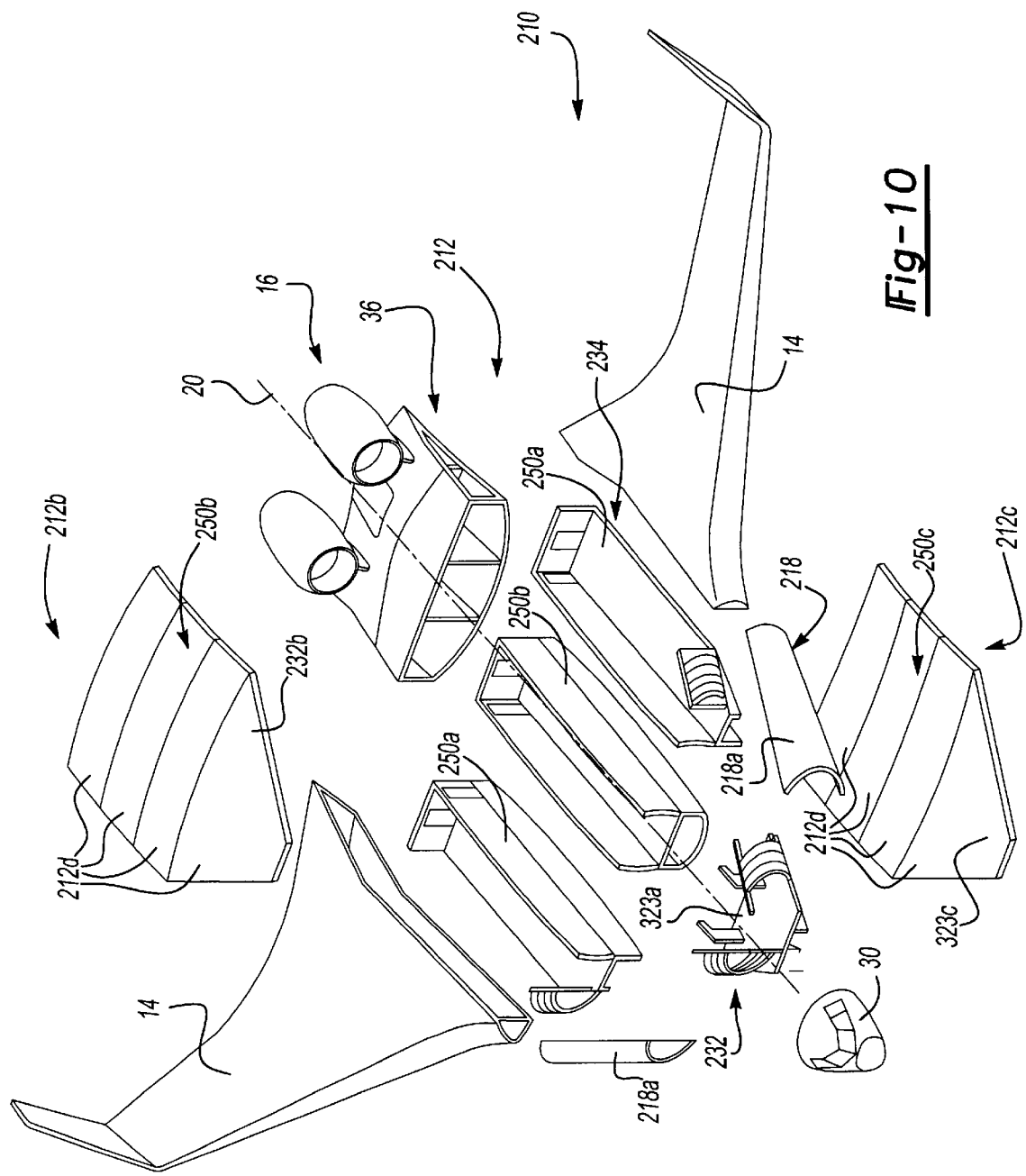

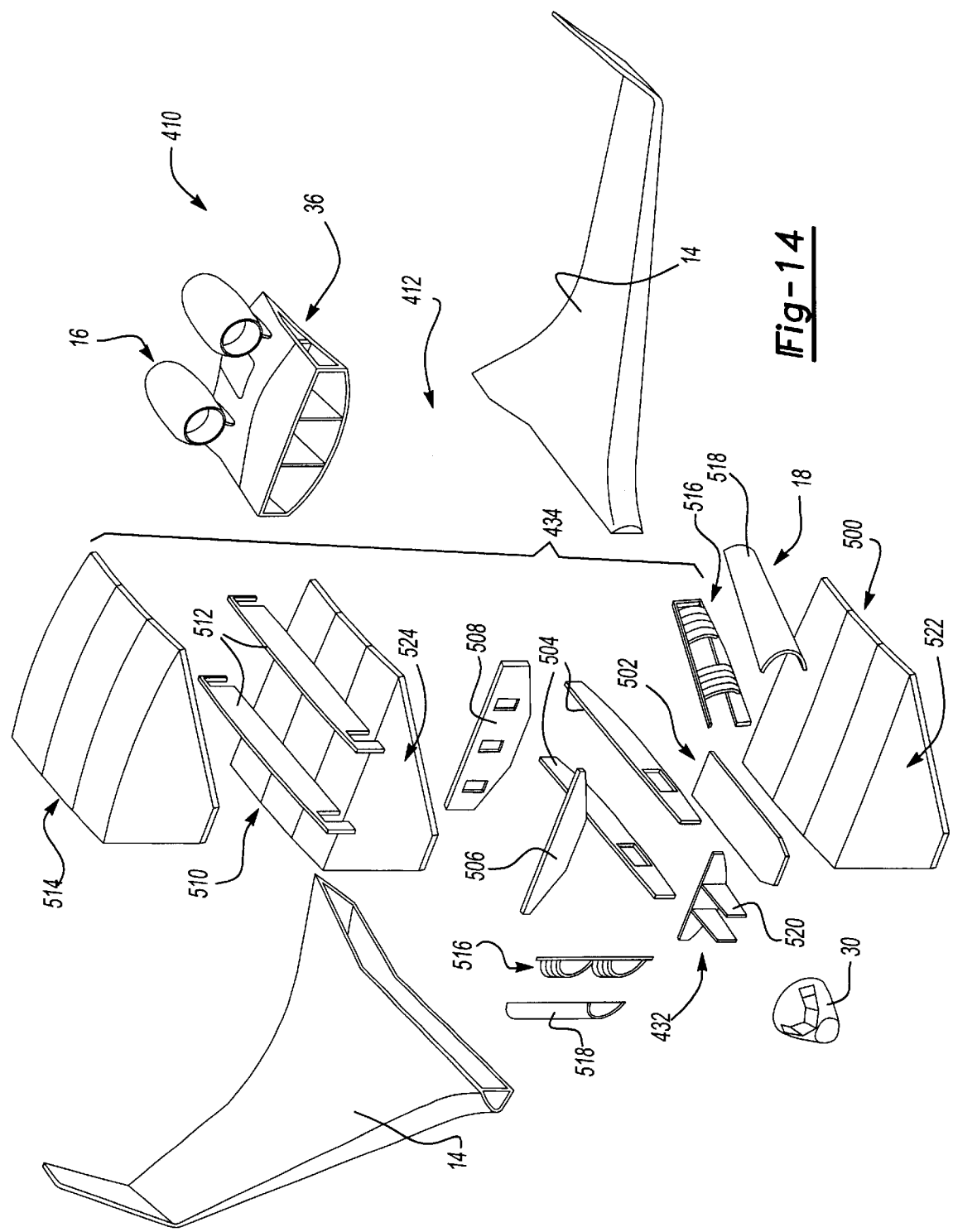

VARIABLE SIZE BLENDED WING BODY AIRCRAFT

FIELD OF THE INVENTION

The present invention generally relates to aircraft and more particularly to an aircraft having a body that is at least partially constructed from a plurality of longitudinally or laterally extending body structures to provide a family of aircraft with each family member having a different cargo capacity.

BACKGROUND OF THE INVENTION

Purchasers of modern airline and cargo aircraft typically require a wide range of capacities to suit the diverse needs of their markets. One option for satisfying these needs is to provide several uniquely designed aircraft, with each design being optimized for an equally unique market. This approach, however, is extremely costly, not only in terms of development and manufacture, but also in terms of their operation, maintenance and servicing. Instead, capacity variations in conventional airline and cargo aircraft are achieved by adding or removing pieces of a constant diameter tubular fuselage section.

In contrast, blended wing body aircraft designs, also known as flying wing designs, lack a "constant" section whose length can be varied so as to provide the desired variation in capacity. Furthermore, the careful shaping of these designs to permit efficient flight at transonic Mach speeds and adequate internal volume negates the incorporation of simplistic changes to the design that add capacity yet unacceptably effect the balance of the aircraft due to the wing sweep that is required at high transonic cruise speeds. Such changes also tend to negatively effect the lofting and aerodynamics of alternate capacity versions.

U.S. Pat. No. 5,909,858 to Hawley discloses on solution for varying the capacity of a blended wing body aircraft. The Hawley design employs a variable size body, a pair of wing assemblies and a pair of transition sections. The body is broken up into a plurality of longitudinally extending segments that are based on a single design but which are mirrored across the centerline of the aircraft. Variable capacity is achieved by simply adding or subtracting pairs the segments from the body. The transition section has a negative sweep angle and couples each side of the body of the aircraft to one of the wing assemblies. While the identically configured segments permit the preservation of a common wing assembly and greatly reduce costs associated with the design, tooling, manufacture and maintenance of the aircraft, several drawbacks of this configuration have been noted.

One such drawback concerns the sharp discontinuity in the wing chord between the wing and the body of the aircraft. This results in a lift distribution that can be unfavorable to drag and stall characteristics. Furthermore, the balance of the aircraft is unlikely to be retained over several differently sized configurations. Accordingly, there remains a need in the art for a blended wing body aircraft having a modular construction that permits easy and cost-effective variations in the size of the aircraft yet which retains balance, aerodynamic loft and aerodynamic performance.

SUMMARY OF THE INVENTION

In one preferred form, the present invention provides a blended wing body aircraft having a pair of aircraft wings and an aircraft body. The aircraft body has a centerbody cabin formed from a plurality of body structures that include a pair of end body structures and at least one intermediate body structure. Each of the plurality of body structures defines a cargo compartment and are arranged about a centerline of the centerbody cabin such that each of the end body structures are juxtaposed between the at least one intermediate body structure and one of the aircraft wings.

In another preferred form, the present invention provides a blended wing body aircraft having a pair of aircraft wings and an aircraft body that is at least partially formed from a plurality of longitudinally-extending body structures. Each of the body structures on a first side of a centerline of the aircraft body is uniquely configured and arranged generally parallel to the centerline of the aircraft body. Each of the body structures on a second side of the centerline of the aircraft body is a mirror-image of an associated one of the body structures on the first side of the centerline of the aircraft body.

In another preferred form, the present invention provides a blended wing body aircraft having a pair of aircraft wings, an aircraft body and a propulsion unit. The aircraft body has a centerbody cabin, which is constructed from a plurality of body structures, and an aft centerbody cabin, which is coupled to a rearward end of the centerbody cabin. The propulsion unit is coupled to the aft centerbody cabin.

In another preferred form, the present invention provides a blended wing body aircraft having a pair of aircraft wings and an aircraft body that is at least partially formed from a plurality of longitudinally-extending body structures. Each of the body structures that are positioned such that their body structure centerline is not coincident with a centerline of the aircraft body includes a tip portion that forms a portion of the leading edge of the blended wing body aircraft. The tip portion has an inner edge with a first portion that extends outwardly away from a centerline of an associated one of the body structures and a second portion that is coupled to the first portion and extends forwardly and outwardly toward the leading edge of the blended wing body aircraft.

In yet another preferred form, the present invention provides a blended wing body aircraft having a pair of aircraft wings and an aircraft body that is at least partially formed from a plurality of longitudinally-extending body structures and a pair of leading edge panels. Each of the body structures that are positioned such that their body structure centerline is not coincident with a centerline of the aircraft body includes a tip portion that terminates rearwardly of a leading edge of the blended wing body aircraft. The tip portion has an inner edge with a first portion that extends outwardly away from a centerline of the aircraft body. Each leading edge panel is coupled to a portion of the body structures and one of the aircraft wings and forms at least a portion of a leading edge of the blended wing body aircraft.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Additional advantages and features of the present invention will become apparent from the subsequent description and the appended claims, taken in conjunction with the accompanying drawings, wherein:

FIG. 10 is an exploded perspective view of a blended wing body aircraft constructed in accordance with the teachings of another aspect of the present invention;

FIG. 14 is an exploded perspective view of an aircraft constructed in accordance with the teachings of yet another aspect of the present invention.

DETAILED DESCRIPTION OF THE PREFERRED EMBODIMENTS

Figure 1:
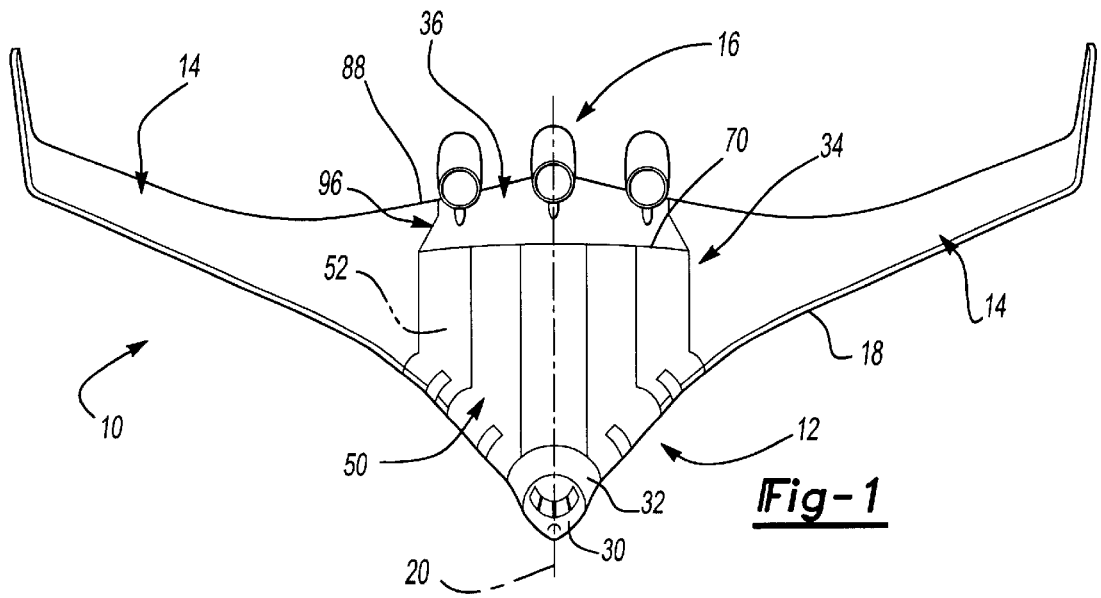
FIG. 1 is a perspective view of a blended wing body aircraft constructed in accordance with the teachings of the present invention.
Figure 3:
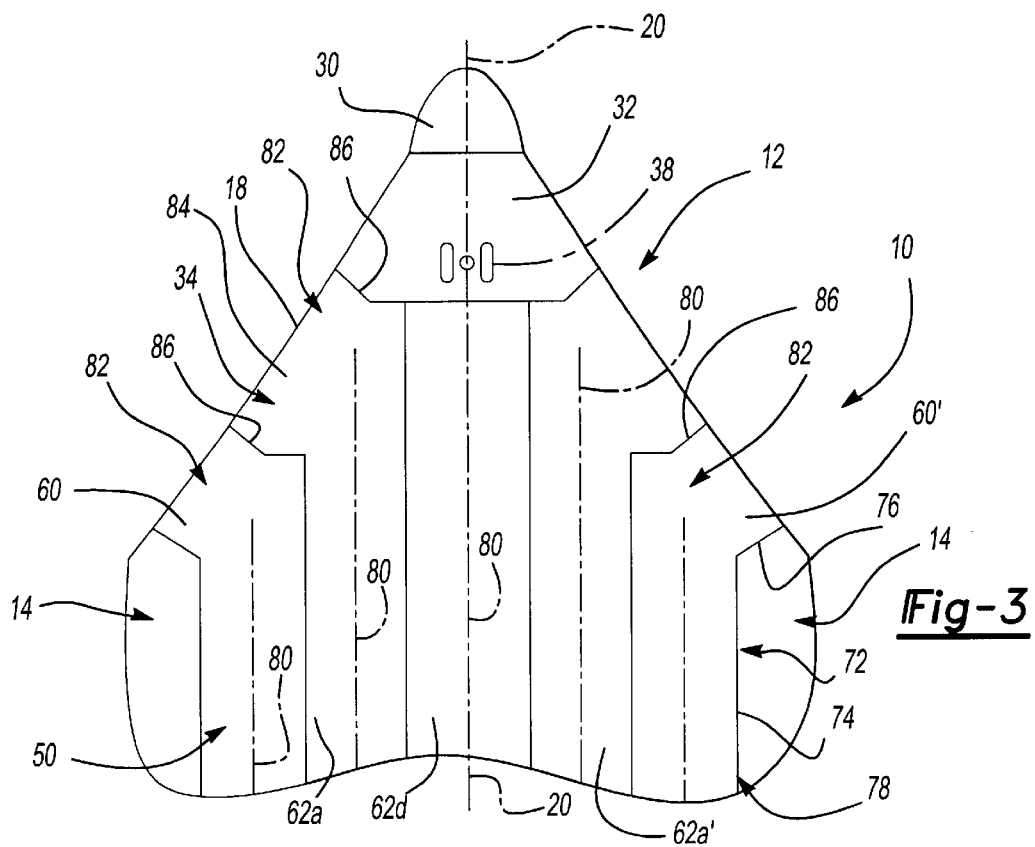
FIG. 3 is a top view of a portion of the blended wing body aircraft of FIG. 1.
Figure 2:
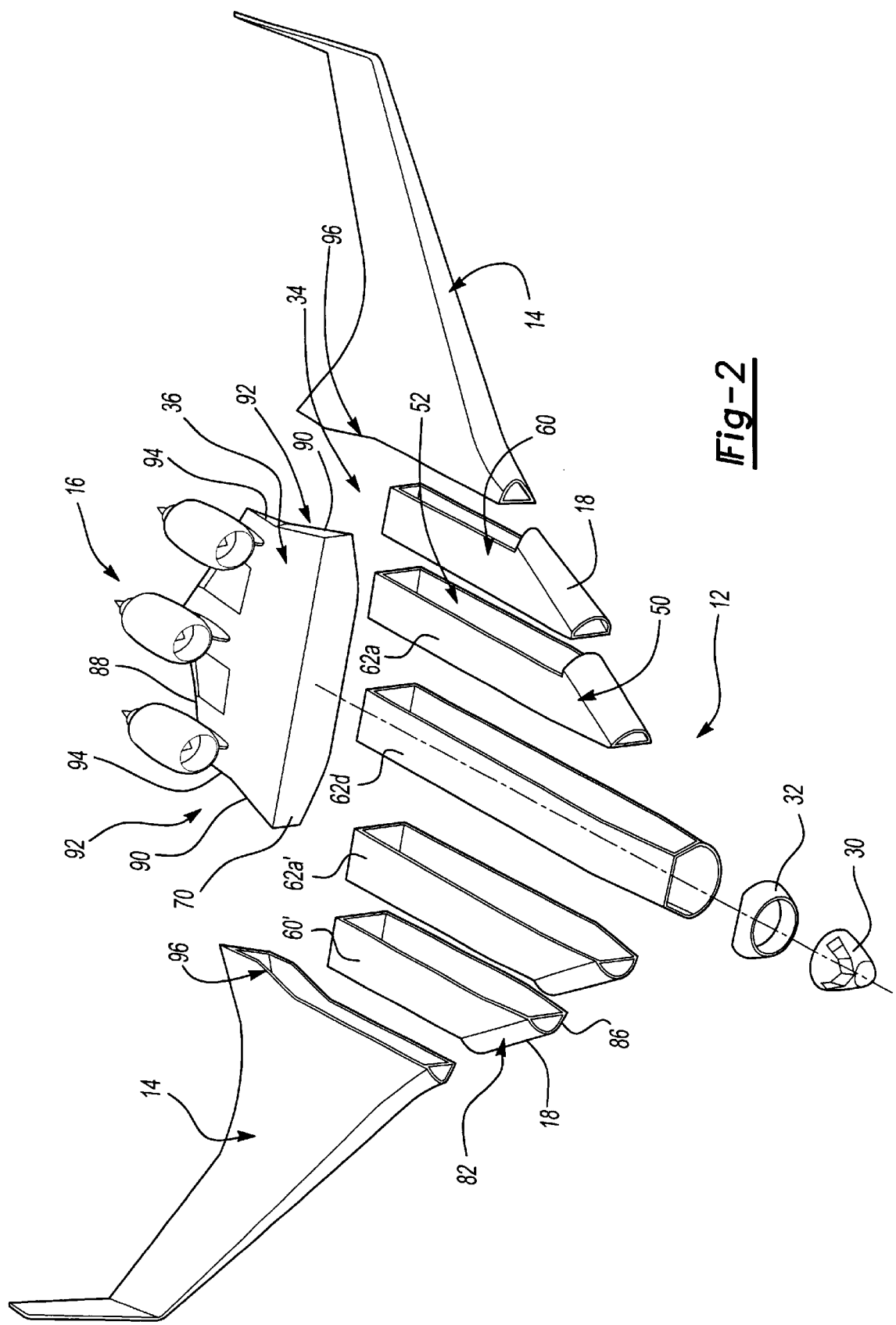
FIG. 2 is an exploded perspective view of the blended wing body aircraft of FIG. 1.

With reference to FIGS. 1 through 3 of the drawings, a blended wing body aircraft constructed in accordance with the teachings of the present invention is generally indicated by reference numeral 10. Aircraft 10 is illustrated to include an aircraft body 12, a pair of aircraft wings 14, a propulsion system 16 which is shown to include a plurality of jet engines, a leading edge 18, which is cooperatively defined by the aircraft wings 14 and the aircraft body 12 and a centerline 20. The aircraft body 12 and aircraft wings 14 are each illustrated to have positive sweep angles.

Figure 4:
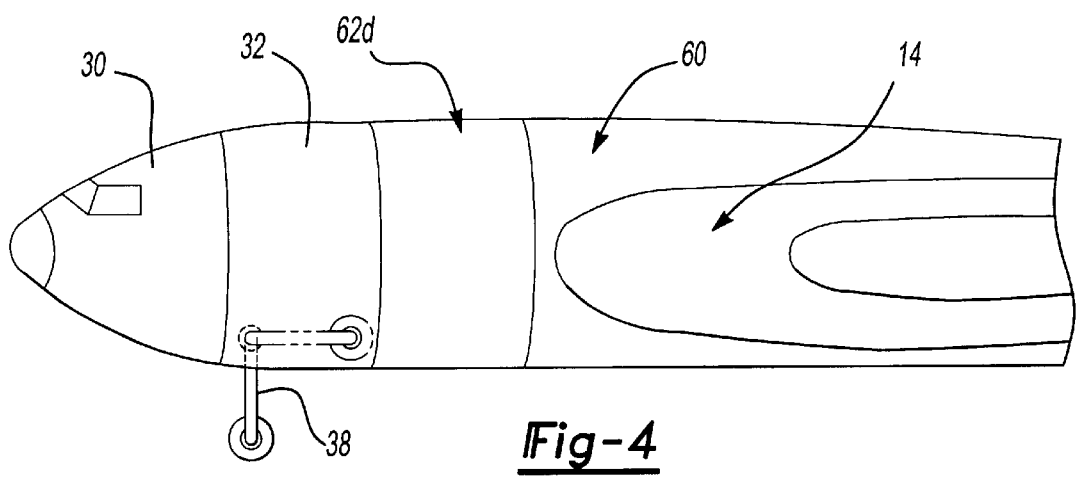
FIG. 4 is a side view of a portion of the blended wing body aircraft of FIG. 1 illustrating the landing gear in an extended position and a retracted position.
Figure 5A:
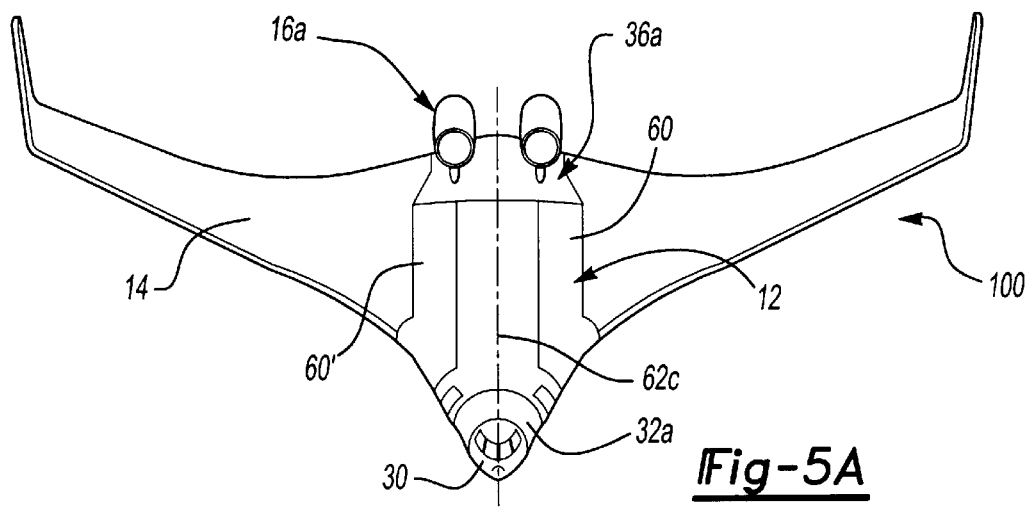
FIGS. 5A through 5D illustrate a family of differently sized blended wing body aircraft that are based upon the design of the aircraft of FIG. 1.
Figure 5B:
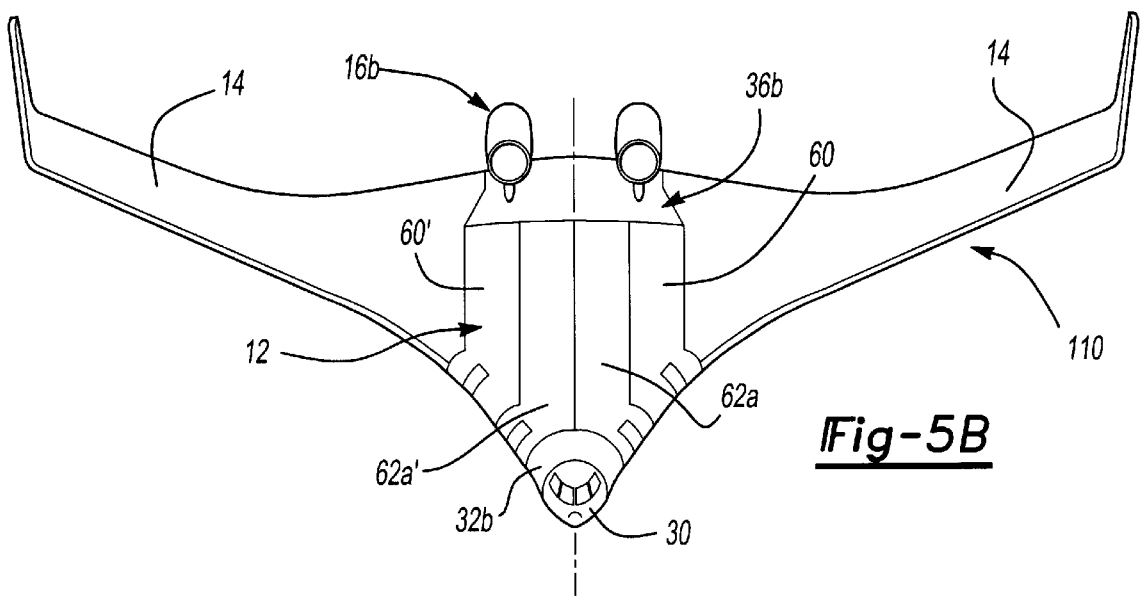
Figure 5C:
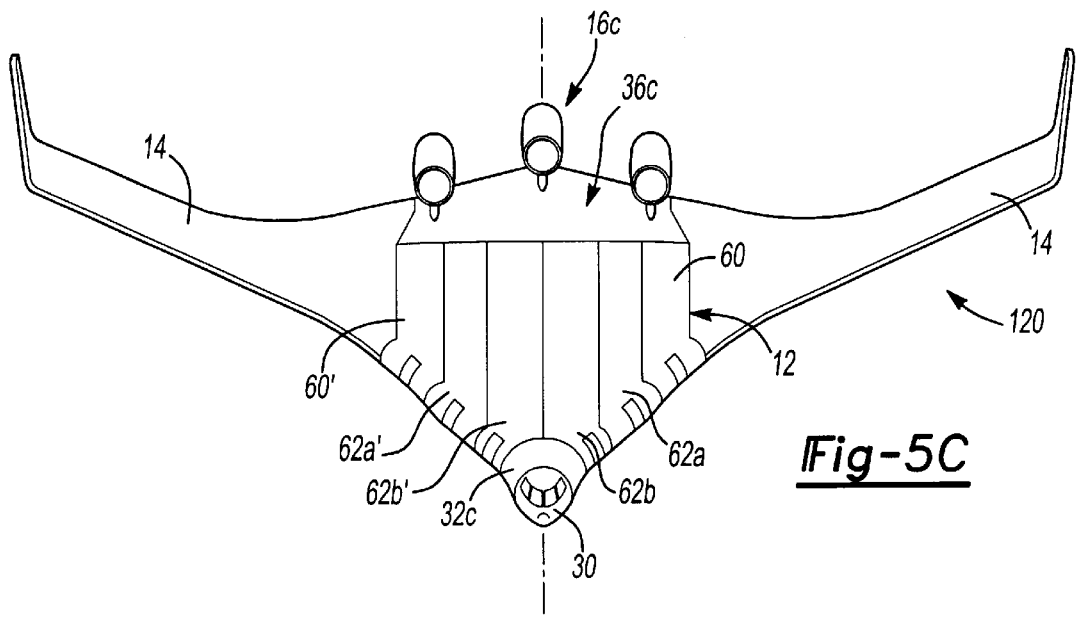
Figure 5D:
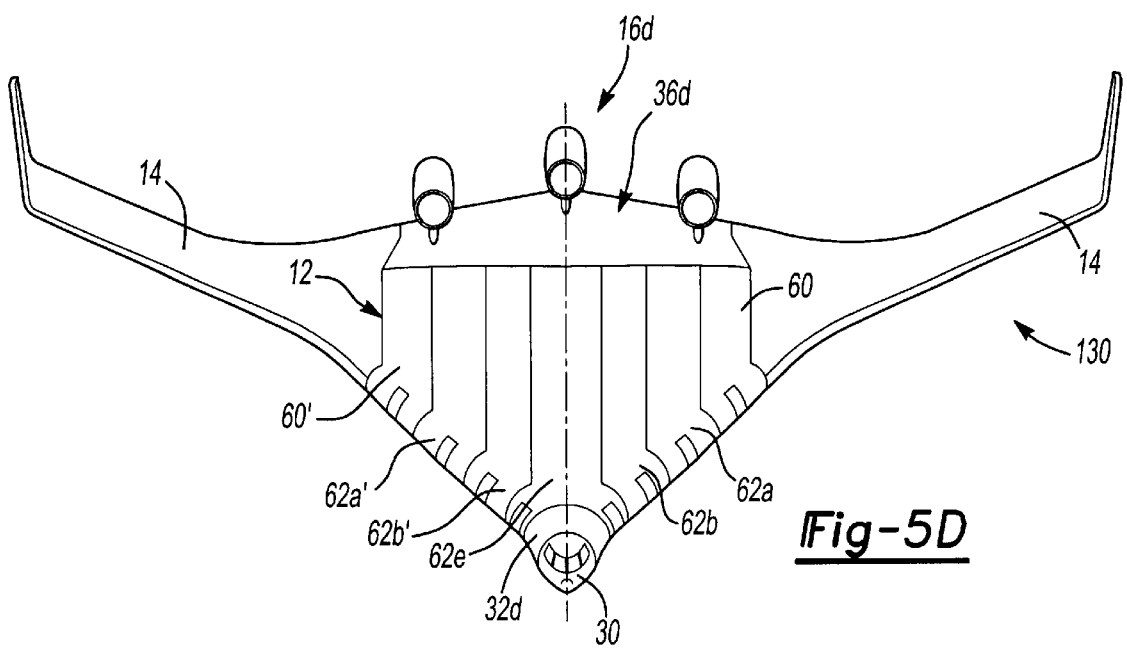

In the particular embodiment illustrated, the aircraft body 12 is shown to include a cockpit 30, a transition section 32, a centerbody cabin 34 and an aft centerbody cabin 36. The transition section 32 is unique to the configuration of the aircraft 10, thereby ensuring that the aircraft 10 will be provided with a smooth aerodynamic and structural transition between the cockpit 30 and the centerbody cabin 34. The transition section 32 is also employed for housing the front aircraft landing gear 38 as illustrated in FIG. 4 and as such, its construction may also be tailored as necessary in response to the space and structural demands imposed by the front aircraft landing gear 38.

The centerbody cabin 34 is formed from a plurality of longitudinally-extending body structures 50, with each of the body structures 50 on a first side of the centerline 20 of the aircraft 10 being uniquely configured and oriented generally parallel to the centerline 20 of the aircraft 10 and each of the body structures 50 on the other side of the centerline 20 of the aircraft 10 being a mirror-image its associated body structure 50 on the first side of the centerline 20 of the aircraft 10. Each of the body structures 50 defines a cargo compartment 52 that may be used to transport passengers or cargo.

More specifically, the plurality of body structures 50 includes a pair of end body structures 60 and 60' and a plurality of intermediate body structures 62a, 62a' and 62d. Those skilled in the art will understand that the body structures 50 having a primed reference numeral (e.g., 60') are mirror images of an associated body structure that is located on an opposite side of the centerline 20 of the aircraft 10 and that is designated by a similar but unprimed reference numeral (e.g., 60). As illustrated, the centerbody cabin 34 is configured such that each of the end body structures (e.g., end body structure 60') is juxtaposed between one of the intermediate body structures (e.g., intermediate body structure 60a') and one of the aircraft wings 14. Accordingly, the aircraft 10 does not include a transition section having a negative sweep angle for interconnecting the aircraft body 12 and aircraft wing 14 and as such, there is no sharp discontinuity in the wing chord between the aircraft wing 14 and the centerbody cabin 34. Preferably, each of the body structures 50 terminates at its rearward point at the rear spar 70 of the aircraft 10, thereby forming the aft pressure bulkhead for the aircraft 10 at the intersection between the centerbody cabin 34 and the aft centerbody cabin 36.

In the particular embodiment illustrated, the outer edge 72 of the end body structures 60 and 60' includes a first portion 74 that is generally parallel to the centerline 20 of the aircraft 10 and a second portion 76 that is angled outwardly toward the aircraft wing 14 and forwardly toward the leading edge 18 of the aircraft 10. The outwardly and forwardly depending second portion 76 of the outer edge 72 reduces the length of the joint 78 between the end body sections 60 and 60' and its mating aircraft wing 14 and improves the strength of the leading edge 18 of the aircraft 10. As shown, the second portion 76 of the outer edge 72 and the leading edge 18 of the aircraft 10 are substantially perpendicular to one another.

In the particular embodiment illustrated, each of the body structures 50 that is positioned such that its centerline 80 is not coincident with the centerline 20 of the aircraft 10 includes a tip portion 82. The tip portion 82 includes a forward portion 84 that forms a portion of the leading edge 18 of the aircraft 10. The tip portion 82 includes an inner edge 86 that is configured to mate with a forwardly positioned portion of the aircraft body 12. For example, the inner edge 86 of the tip portion 82 of end body structure 60' is configured to mate with the forwardly positioned portion of intermediate body structure 62a'. Similarly, the inner edge 86 of the tip portion 82 of the intermediate body structure 62a is configured to mate with the forwardly positioned transition section 32 to create a smooth loft at the intersection therebetween.

The aft centerbody cabin 36 fairs out the body of the aircraft 10 and into the aircraft wings 14 and forms a portion of the trailing edge 88 of the aircraft 10. In the particular embodiment illustrated, the aft centerbody cabin 36 serves at the mounting point for the propulsion system 16. Preferably, the aft centerbody cabin 36 is unique to the configuration of the aircraft 10, thereby permitting the structural and aerodynamic characteristics of the aft centerbody cabin 36 to be tailored in a desired manner so as to better integrate the propulsion system 16 into the aircraft 10.

In the embodiment illustrated, a portion 90 of each of the outboard sides 92 of the aft centerbody cabin 36 is shown to be skewed to the centerline 20 of the aircraft body 12, angling forwardly and outwardly from the trailing edge 88 of the aircraft 10. Another portion 94 of each of the outboard sides 92 is shown to be skewed to the forwardly and outwardly angled portion 90 by an angle that is less than 180 degrees. The forwardly and outwardly angled portion 90 of the aft centerbody cabin 36 is complementary to the inwardly and rearwardly angled portion 96 of the aircraft wings 14 and aids in locking the aft centerbody cabin 36 and aircraft wings 14 together.

With additional reference to FIGS. 5A through 5D, the modular design of the aircraft 10 is employed to provide a family of differently configured aircraft which includes the aircraft 10 and the aircraft designated by reference numerals 100, 110, 120 and 130. The aircraft 100, for example, includes the aircraft wings 14, the end body structures 60 and 60' and the cockpit 30 that are common to aircraft 10. The aircraft 100, however, includes an intermediate body structure 62c, a transition section 32a, an aft centerbody cabin 36a and a propulsion system 16a that are unique to this configuration.

A relatively higher degree of similarity is found between the aircraft 110, 120 and 130 and the aircraft 10 as the aircraft wings 14, the end body structures 60 and 60', the intermediate body structures 62a and 62a' and the cockpit 30 that are common to all of these aircraft. The aircraft 120 includes a pair of intermediate body structures 62b and 62b' that are not employed by any of the smaller aircraft but which are employed by the larger aircraft 130. The aircraft 110 and 120 each include unique transition sections 32b and 32c, respectively, unique aft centerbody cabins 36b and 36c, respectively, unique propulsion systems 16b and 16c, respectively. The aircraft 130 includes a unique intermediate body structure 62e, a unique transition section 32d, a unique aft centerbody cabin 36d and a unique propulsion system 16d. Those skilled in the art will understand that although the transition sections are described herein as being unique to each aircraft configuration, it is within the scope of the present invention to employ a transition section that is common to each of the aircraft configurations. Unique transition sections are presently preferred to provide the aircraft configuration with a smooth aerodynamic and structural transition between the cockpit 30 and the centerbody cabin 34 since in some instances it may be necessary to shift the cockpit 30 up or down relative to the centerbody cabin 34.

From the foregoing, it should be apparent to those skilled in the art that the capacity of the aircraft 10 is varied by adding or subtracting body structures 50 from the middle of the centerbody cabin 34, rather than by adding or subtracting body structures 50 from the lateral sides of the centerbody cabin 34. Construction in this manner permits the intermediate body structures 62a, 62a', 62b, 62b', 62c, 62d and 62e to be tailored to the handle the progressively larger wing bending loads that are associated with the larger aircraft configurations. In this regard, the construction of each of the body structures 50 on a first side of the centerline 20 of the aircraft 10 varies such that the maximum wing bending load of a body structure 50 located closer to the centerline 20 (e.g., intermediate body structure 62a) is greater than the maximum wing bending load of a body structure 50 located further from the centerline 20 (e.g., end body structure 60).

The aircraft wings 14, being common across the entire family of aircraft 10, 100, 110, 120 and 130, are designed to handle the highest wing bending loads. The smallest aircraft in the family (i.e., aircraft 100) would then suffer a modest weight penalty, but this could be reduced or eliminated by re-gauging the aircraft wings 14 in the manner in which conventional wings are sometimes re-gauged today.

Figure 6:
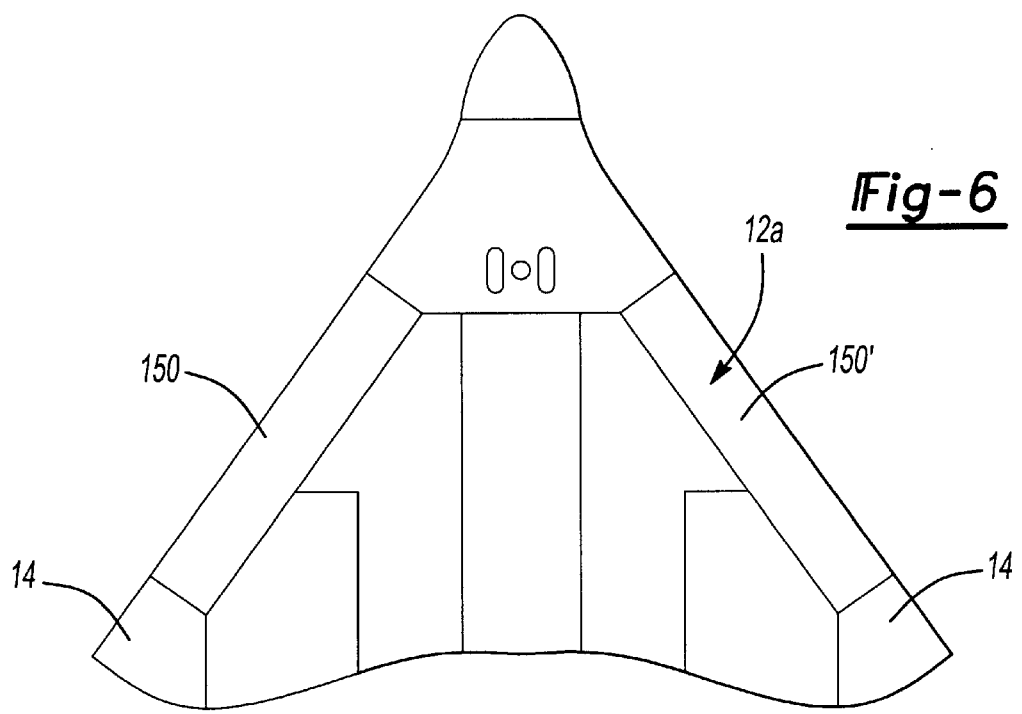
FIG. 6 is a top view of a portion of a blended wing body aircraft constructed in accordance with the teachings of another aspect of the present invention.
Figure 7A:
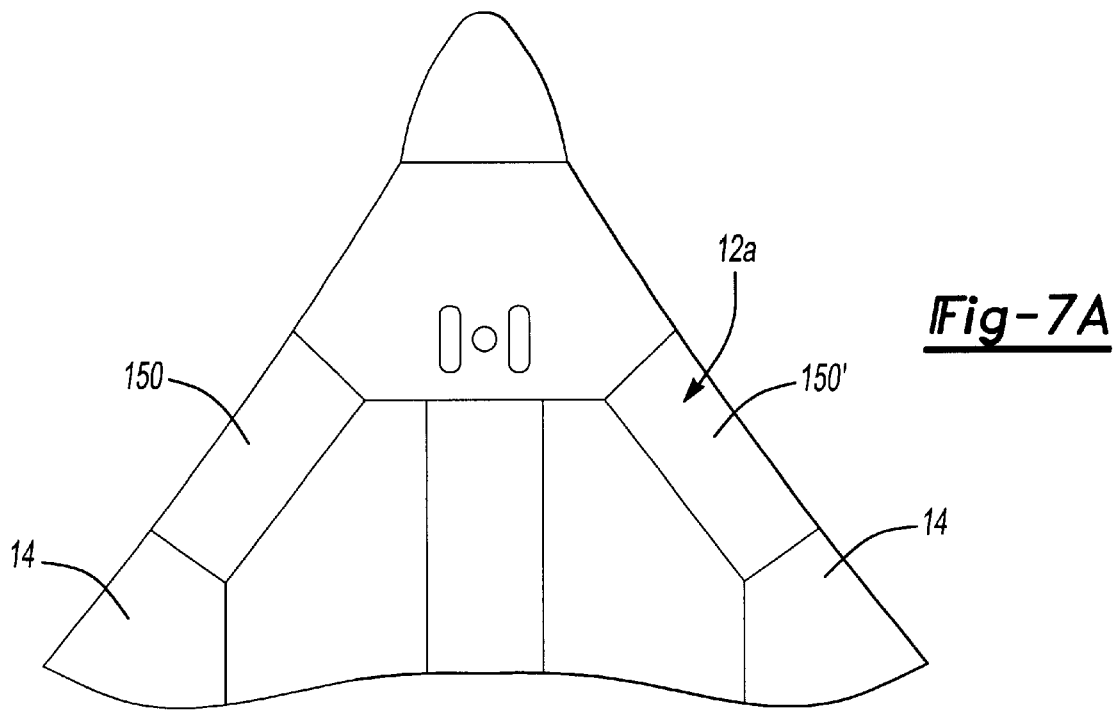
FIGS. 7A through 7B are top views of a portion of a family of differently sized blended wing body aircraft that are based upon the design of the aircraft of FIG. 6.
Figure 7B:
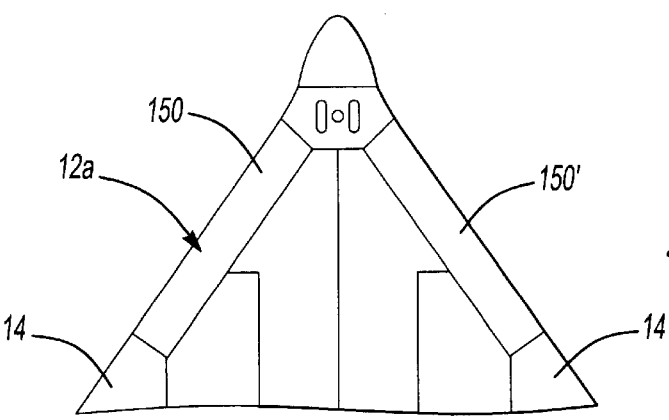

While the aircraft 10 has been described thus far as having a plurality of body structures 50 that cooperate to define both a centerbody cabin and a portion of the leading edge 18 of the aircraft 10, those skilled in the art will appreciate that the invention, in its broader aspects, may be constructed somewhat differently. For example, the body structures 50 may be configured to terminate rearwardly of the leading edge of the aircraft 10a as illustrated in FIG. 6. In this arrangement, the portion of the leading edge 18 that had formerly been associated with the centerbody cabin 34 is defined by a pair of leading edge panels 150 and 150' that are coupled to the aircraft body 12a and the aircraft wings 14. With additional reference to FIGS. 7A through 7B, the length of the leading edge panels 150 and 150' is illustrated to change in accordance with variations in the capacity of the aircraft.

Figure 8:
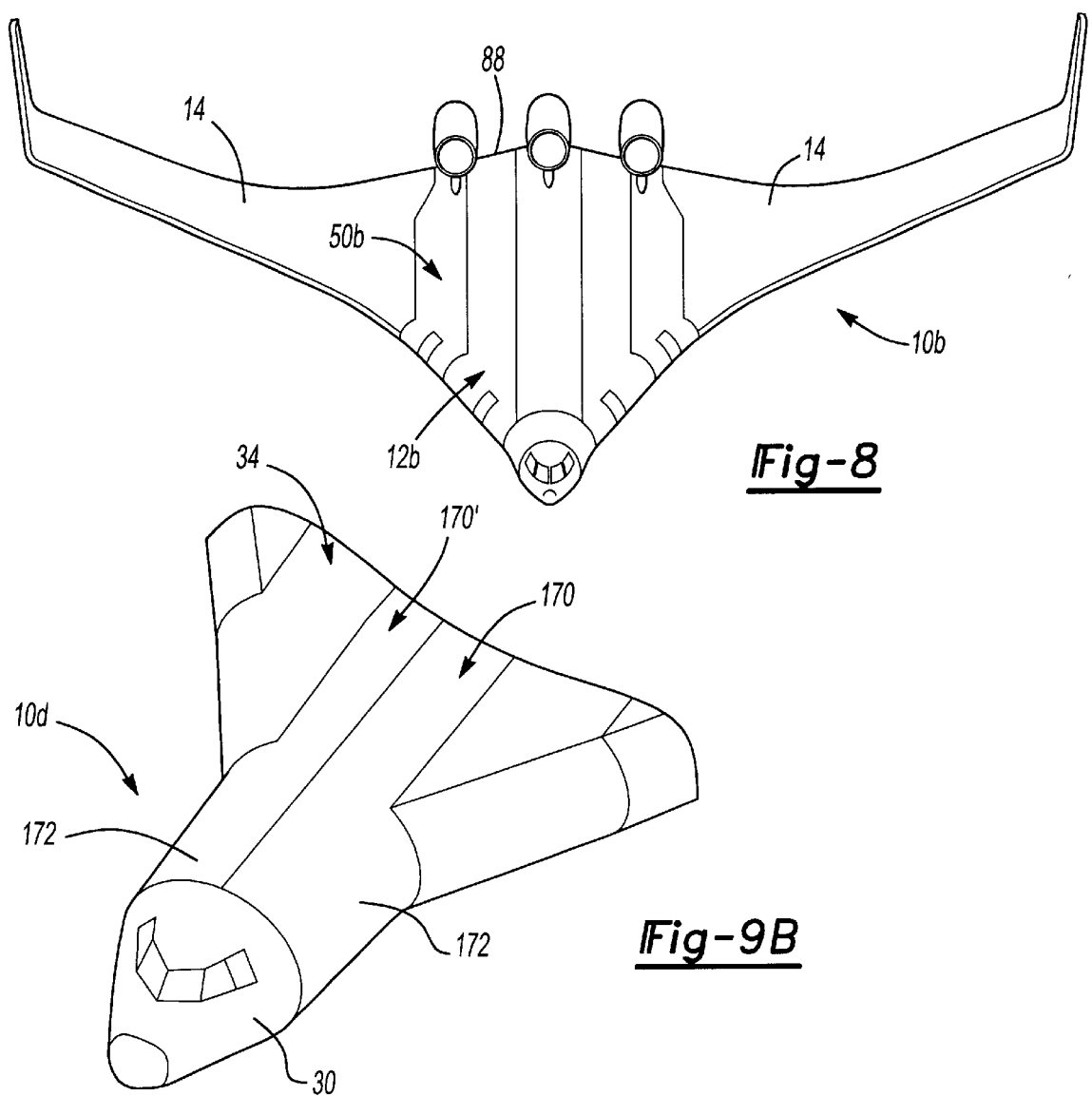
FIG. 8 is a perspective view of a blended wing body aircraft constructed in accordance with the teachings of another aspect of the present invention.
Figure 9B:
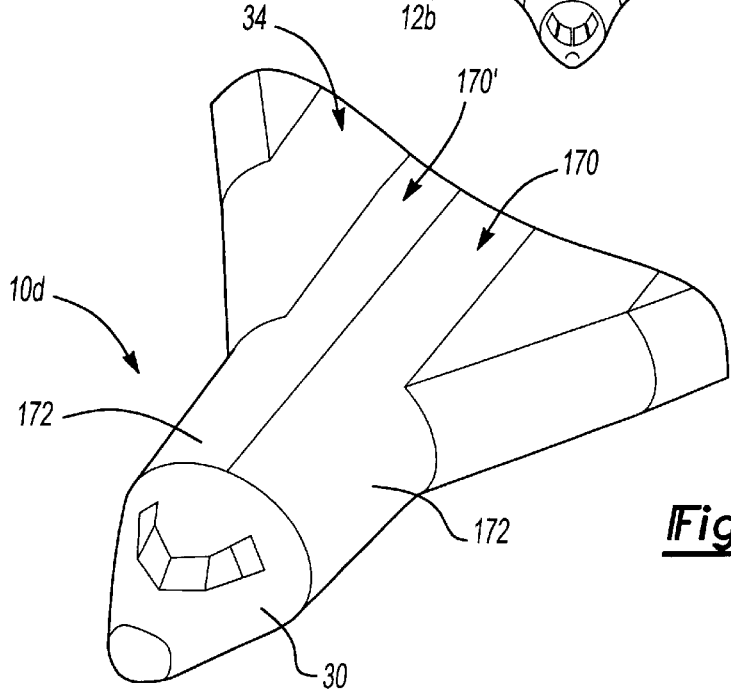
FIGS. 9A and 9B are perspective views of a portion of a pair of blended wing body aircraft constructed in accordance with the teachings of yet another aspect of the present invention.
Figure 9A:
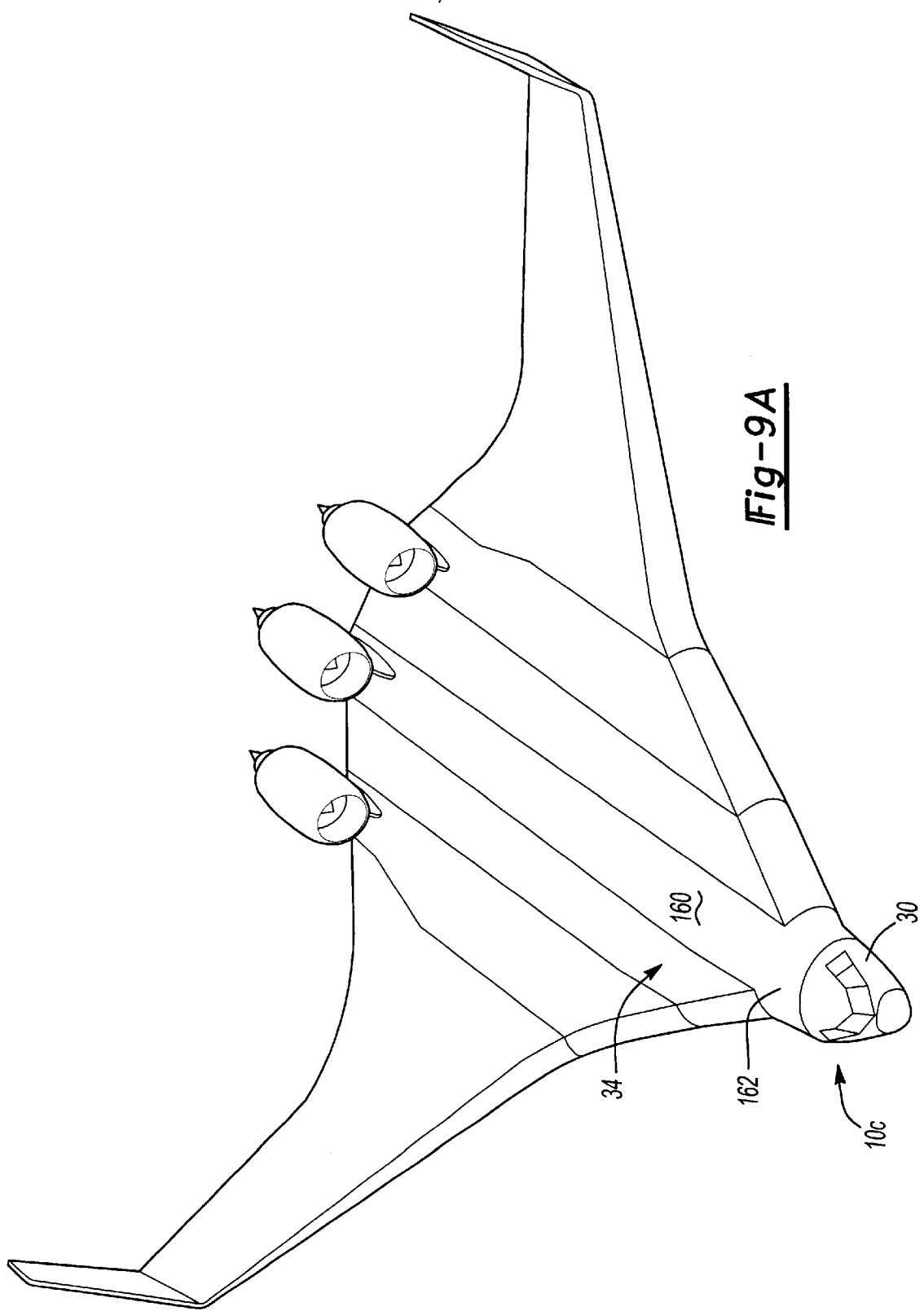

Another example is illustrated in FIG. 8 wherein the aircraft 10b is shown to be substantially similar to aircraft 10 except for the construction of the aft end of the aircraft body 12b. In this regard, the body structures 50b that form a portion of the aircraft body 12b are lengthened to form the trailing edge 88 of the aircraft, eliminating the need for the aft centerbody cabin 36.

Yet another example is illustrated in FIGS. 8A and 8B wherein the aircraft 10c and 10d is shown to be substantially similar to aircraft 10 except with regard to the connection of the centerbody cabin 34 to the cockpit 30. As discussed above, the aircraft 10 includes a transition section 32 that is disposed between the centerbody cabin 34 and the cockpit 30. The aircraft 10c, however, includes an intermediate body structure 160 having a cockpit transition portion 162, which permits the cockpit 30 to be coupled directly to the centerbody cabin 34. Similarly, the aircraft 10d includes intermediate body structures 170 and 170', each of which having a cockpit transition portion 172, which, after the intermediate body structures 170 and 170' are coupled to one another, permits the cockpit 30 to be coupled directly to the centerbody cabin 34.

A further example is illustrated in FIG. 10 wherein an aircraft constructed in accordance with the teachings of another alternate embodiment is generally indicated by reference numeral 210. Aircraft 210 is generally similar to aircraft 10 in that it includes an aircraft body 212, a pair of aircraft wings 14, a propulsion system 16, a leading edge 218 and a centerline 20. The aircraft body 212 includes a cockpit 30, a transition section 232, a centerbody cabin 234 and an aft centerbody cabin 36. The centerbody cabin 234 differs from the centerbody cabin 34 in that it is formed from a plurality of longitudinally extending body structures 250a, an upper body skin assembly 250b and a lower body skin assembly 250c, as opposed to the set of body structures 50 wherein each of the body structures 50 includes both its structural framing and its upper and lower skins. The body structures 250a essentially form a frame or skeleton onto which the upper and lower body skins 250b and 250c are attached.

The transition section 232 likewise differs from the transition section 32 in that it is formed from a transition frame assembly 232a, an upper skin assembly 232b and a lower skin assembly 232c. A pair of leading edge skins 218a cover the leading edge ribs 218b that are formed into the body structures 250a and the transition frame assembly 232a. In the particular embodiment illustrated, upper skin assembly 232b is shown to be coupled to upper body skin assembly 250b to form a portion of the upper outer body surface 212b. Similarly, the lower skin assembly 232c is shown to be coupled to lower body skin assembly 250c to form a portion of the lower outer body surface 212c. Those skilled in the art will understand, however, that while the portions of the upper and lower outer body surfaces 212b and 212c are shown as a complete assembly that is exploded from the body structures 250a and the transition frame assembly 232a, the upper and lower outer body surfaces 212b and 212c are preferably coupled to the body structures 250a and the transition frame assembly 232a in segments 212d, rather than as a complete assembly.

Construction in this manner permits the segments 212d to run span-wise (i.e., perpendicular to the centerline 20) to thereby reinforce the structure of the aircraft body 212 while permitting a relatively high degree of flexure. Accordingly, the aircraft body 212 is relatively stronger and lighter in weight than aircraft body 12.

Figure 11:
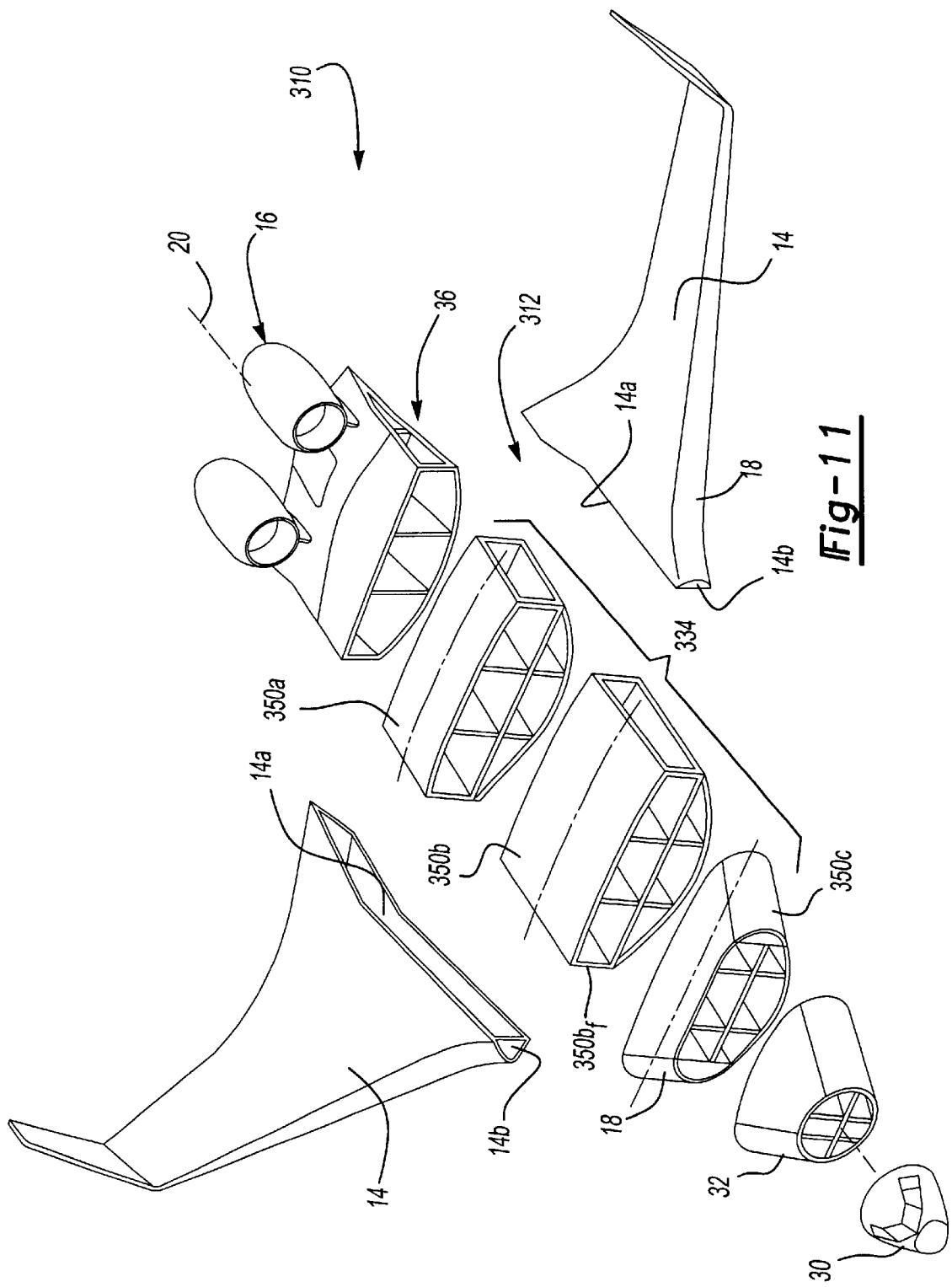
FIG. 11 is a top view of a blended wing body aircraft constructed in accordance with the teachings of another aspect of the present invention.

Another example is illustrated in FIG. 11, wherein an aircraft constructed in accordance with the teachings of another alternate embodiment is generally indicated by reference numeral 310. Aircraft 310 is generally similar to aircraft 10 in that it includes an aircraft body 312, a pair of aircraft wings 14, a propulsion system 16, a leading edge 18 and a centerline 20. The aircraft body 312 includes a cockpit 30, a transition section 32, a centerbody cabin 334 and an aft centerbody cabin 36. The centerbody cabin 334 differs from the centerbody cabin 34 in that it is formed from a plurality of laterally extending (i.e., spanwise) body structures 350, as opposed to a set of longitudinally extending body structures 50 (FIG. 1). The body structures 350a and 350b are shown to abut the lateral sides 14a of the aircraft wings 14 and do not form any portion of the leading edge 18 of the aircraft 310. The body structure 350c abuts the forward surface 14b of the aircraft wings 14, as well as the forward surface 350b$_f$ of the body structure 350b and defines a portion of the leading edge 18.

Figure 12:
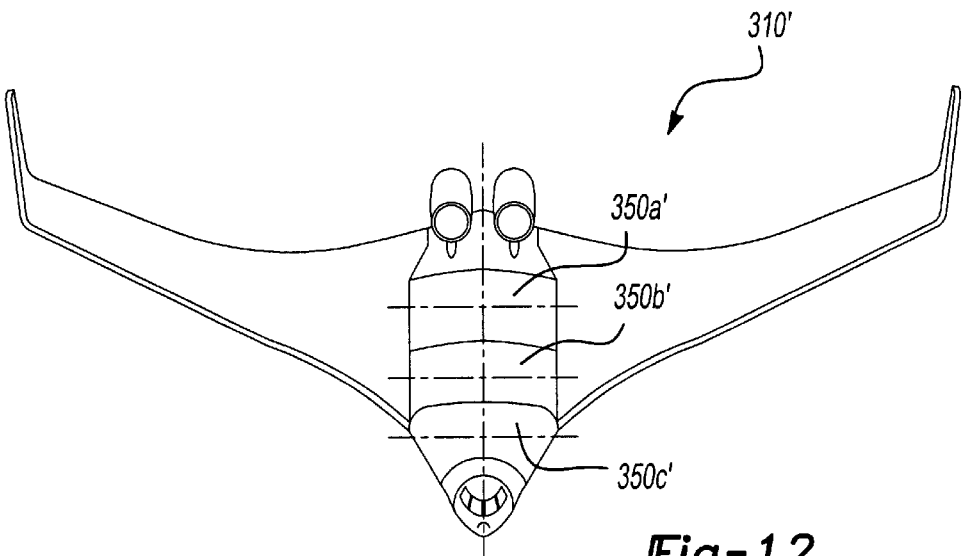
FIG. 12 is a top view of an aircraft that is similar in construction to that of FIG. 11 but smaller in capacity.
Figure 13:
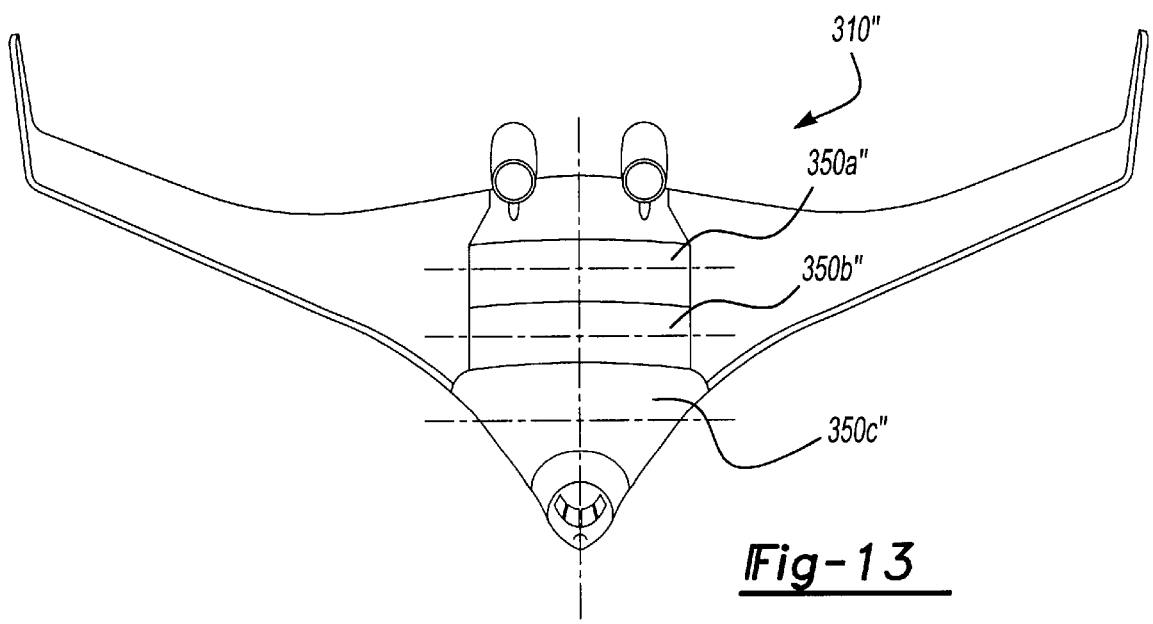
FIG. 13 is an exploded perspective view of an aircraft that is similar in construction to that of FIG. 11 but larger in capacity.

With additional reference to FIGS. 12 and 13, the capacity of the aircraft 310 is varied by altering the configuration of the body structures 350. FIG. 12, for example, illustrates an aircraft 310' having a relatively smaller capacity than that of aircraft 310. As shown, the width of the body structures 350a' and 350b' is relatively smaller than that of the body structures 350a and 350b, and both the length and width of the body structure 350c' are relatively smaller than the length and width of the body structure 350c. FIG. 13 similarly illustrates an aircraft 310" having a relatively larger capacity than that of aircraft 310. As shown, the width of the body structures 350a" and 350b" is relatively larger than that of the body structures 350a and 350b, and both the length and width of the body structure 350c" are relatively larger than the length and width of the body structure 350c. While the configuration of the aircraft 310 in this manner prevents multiple the body structures 350 from being used across a family of aircraft, the use of spanwise extending body structures 350 is structurally efficient, permitting the overall weight of the aircraft 310 to be reduced as compared to that of aircraft 10.

In FIG. 14, an aircraft constructed in accordance with the teachings of yet another alternate embodiment is generally indicated by reference numeral 410. Aircraft 410 is generally similar to aircraft 10 in that it includes an aircraft body 412, a pair of aircraft wings 14, a propulsion system 16, a leading edge 18. The aircraft body 412 includes a cockpit 30, a transition section 432, a centerbody cabin 434 and an aft centerbody cabin 36. Unlike the previously described embodiments, the transition section 432 and the centerbody cabin 434 are not modular in their form, but rather are formed from a plurality of components that are collectively assembled when the aircraft 410 is being assembled. The centerbody cabin 434 is shown to include a lower cover panel 500, a cargo floor 502, a plurality of lower ribs 504, an intermediate spar 506, a rear spar 508, a floor 510, a plurality of upper ribs 512, an upper cover panel 514, a pair of leading edge frames 516 and a pair of leading edge skins 518. The transition section 432 includes a transition frame 520 and lower and upper cover panels 522 and 524, respectively.

The construction of the lower ribs 504 is such that their cross-sections are identical, and that the overall length of each of the lower ribs 504 is adjusted according to its placement within the centerbody cabin 434 as well as the overall capacity of the aircraft 410. Similarly, the construction of the upper ribs 512 is such that their cross-sections are identical, and that the overall length of each of the upper ribs 512 is adjusted according to its placement within the centerbody cabin 434 as well as the overall capacity of the aircraft 410.

In varying the capacity of the aircraft 410, the length and width of the centerbody cabin 434 will grow or shrink as necessary, in much the same manner as the centerbody cabin 34 grows or shrinks when the capacity of aircraft 10 is changed. To accommodate these changes, the spars 506 and 508, the ribs 504 and 512, the leading edge frames 516 and the leading edge skins 518 will grow or shrink in length as necessary, and the length and width of the panels 500 and 514 and the floors 502 and 510 will grow or shrink in length and width as necessary. Additionally, it may also be necessary to add or delete one or more spars 506 and ribs 504 and 512.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the foregoing description and the appended claims.

What is claimed is:

1. A blended wing body aircraft comprising:
   a pair of aircraft wings; and
   an aircraft body having a centerbody cabin at least partially formed from a plurality of body structures, the plurality of body structures including a pair of end body structures and at least one intermediate body structure, each of the plurality of body structures defining a cargo compartment, the plurality of body structures being arranged about a centerline of the centerbody cabin such that each of the end body structures are juxtaposed between the at least one intermediate body structure and one of the aircraft wings.

2. The blended wing body aircraft of claim 1, wherein the aircraft body further comprises an aft centerbody that is coupled to a rearward end of the centerbody cabin.

3. The blended wing body aircraft of claim 2, wherein the aft centerbody and the centerbody cabin abut one another at a rear spar.

4. The blended wing body aircraft of claim 2, wherein a propulsion device for propelling the blended wing body aircraft is mounted to the aft centerbody.

5. The blended wing body aircraft of claim 1, wherein the aircraft body further comprises a cockpit and a transition section disposed between the cockpit and the centerbody cabin.

6. The blended wing body aircraft of claim 5 wherein a front landing gear assembly is housed in the transition section.

7. The blended wing body aircraft of claim 1, wherein each of the body structures has a body structure centerline, and wherein each of the body structures that is positioned such that its body structure centerline is not coincident with a centerline of the centerbody cabin includes a tip portion that forms a portion of the leading edge of the blended wing body aircraft, the tip portion including an inner edge that is configured to mate with a forwardly positioned portion of the aircraft body and create a smooth loft at the intersection therebetween.

8. The blended wing body aircraft of claim 7, wherein an outer edge of the end body structure includes a first portion that is generally parallel to the centerline of the centerbody cabin and a second portion that is angled outwardly toward the aircraft wing and forwardly toward the leading edge of the blended wing body aircraft.

9. The blended wing body aircraft of claim 8, wherein the second portion of the outer edge of the end body structure is substantially perpendicular to the leading edge.

10. The blended wing body aircraft of claim 1, wherein each of the body structures terminates rearwardly of a leading edge of the blended wing body aircraft and the aircraft body further includes a pair of leading edge panels, each of the leading edge panels coupled to the centerbody cabin, the aircraft wing and a portion of the aircraft body forward of the centerbody cabin.

11. The blended wing body aircraft of claim 1, wherein the aircraft body has an upper outer surface and a lower outer surface and wherein the aircraft body further comprises an upper skin assembly and a lower skin assembly, the upper and lower skin assemblies being coupled to opposite sides of the body structures and forming at least a portion of the upper and lower outer surfaces of the aircraft body.

12. The blended wing body aircraft of claim 1, wherein the aircraft body has an upper outer surface and a lower outer surface and wherein the plurality of body structures cooperate to form at least a portion of both the upper and lower outer surfaces of the aircraft body.

13. A blended wing body aircraft comprising:
a pair of aircraft wings; and
an aircraft body that is at least partially formed from a plurality of longitudinally-extending body structures, each of the body structures on a first side of a centerline of the aircraft body being uniquely configured and oriented generally parallel to the centerline of the aircraft body, and each of the body structures on a second side of the centerline of the aircraft body being a mirror-image an associated one of the body structures on the first side of the centerline of the aircraft body.

14. The blended wing body aircraft of claim 13, wherein the aircraft body includes a uniquely constructed central one of the body structures disposed between the other body structures such that a centerline of the central body structure is coincident with the centerline of the aircraft body.

15. The blended wing body aircraft of claim 13, wherein the construction of each of the body structures on the first side of the centerline of the aircraft body varies such that a maximum wing bending load of a first one of the body structures is greater than a second body structure that is located further away from the centerline of the aircraft body relative to the first body structure.

16. The blended wing body aircraft of claim 13, wherein the body structures cooperate to form a centerbody cabin and wherein the aircraft body further comprises an aft centerbody that is coupled to a rearward end of the centerbody cabin.

17. The blended wing body aircraft of claim 16, wherein the aft centerbody and the centerbody cabin abut one another at a rear spar.

18. The blended wing body aircraft of claim 16, wherein a propulsion device for propelling the blended wing body aircraft is mounted to the aft centerbody.

19. The blended wing body aircraft of claim 13, wherein the aircraft body further comprises a cockpit and a transition section disposed between the cockpit and at least one of the body structures.

20. The blended wing body aircraft of claim 19, wherein a front landing gear assembly is housed in the transition section.

21. The blended wing body aircraft of claim 19, wherein each of the body structures has a body structure centerline, and wherein each of the body structures that is positioned such that its body structure centerline is not coincident with a centerline of the centerbody cabin includes a tip portion that forms a portion of the leading edge of the blended wing body aircraft, the tip portion including an inner edge that is configured to mate with a forwardly positioned portion of the aircraft body and create a smooth loft at the intersection therebetween.

22. The blended wing body aircraft of claim 21, wherein an outer edge of a pair of outermost one of the body structures includes a first portion that is generally parallel to the centerline of the centerline of the aircraft body and a second portion that is angled outwardly toward the aircraft wing and forwardly toward the leading edge of the blended wing body aircraft.

23. The blended wing body aircraft of claim 22, wherein the second portion of the outer edge of the pair of outermost body structures is substantially perpendicular to the leading edge.

24. The blended wing body aircraft of claim 19, wherein each of the body structures terminates rearwardly of a leading edge of the blended wing body aircraft and the aircraft body further includes a pair of leading edge panels, each of the leading edge panels being coupled to the body structures, the aircraft wing and a portion of the aircraft body forward of the body structures.

25. The blended wing body aircraft of claim 13, wherein the aircraft body has an upper outer surface and a lower outer surface and wherein the aircraft body further comprises an upper skin assembly and a lower skin assembly, the upper and lower skin assemblies being coupled to opposite sides of the body structures and forming at least a portion of the upper and lower outer surfaces of the aircraft body.

26. A blended wing body aircraft comprising:
a pair of aircraft wings;
an aircraft body having a centerbody cabin and an aft centerbody cabin, the centerbody cabin being constructed from a plurality of body structures, the aft centerbody cabin being coupled to the rearward end of the centerbody cabin; and a propulsion unit coupled to the aft centerbody cabin.

27. The blended wing body aircraft of claim 26, wherein the aft centerbody and the centerbody cabin abut one another at a rear spar.

28. The blended wing body aircraft of claim 26, wherein the aft centerbody includes a pair of outboard sides, at least a portion of each of the outboard sides of the aft centerbody being skewed to a centerline of the aircraft body and angling forwardly and outwardly, and wherein each of the aircraft wings includes an inwardly and rearwardly angled portion configured to abut the forwardly and outwardly angled portion of the outboard sides of the aft centerbody.

29. The blended wing body aircraft of claim 28, wherein the outboard sides of the aft centerbody further include an aft portion that is skewed to the forwardly and outwardly angled portion of the outboard sides such that the angle between the aft portion and the forwardly and outwardly angled portion is less than 180°.

30. The blended wing body aircraft of claim 29, wherein the aft portion of the outboard sides is generally parallel the centerline of the aircraft body.

31. The blended wing body aircraft of claim 26, wherein the aft centerbody defines a portion of a trailing edge of the blended wing body aircraft.

32. The blended wing body aircraft of claim 26, wherein the aircraft body has an upper outer surface and a lower outer surface and wherein the aircraft body further comprises an upper skin assembly and a lower skin assembly, the upper and lower skin assemblies being coupled to opposite sides of the body structures and forming at least a portion of the upper and lower outer surfaces of the aircraft body.

33. The blended wing body aircraft of claim 32, wherein each of the body structures extends longitudinally along an axis that is parallel a longitudinal axis of the aircraft body.

34. The blended wing body aircraft of claim 32, wherein each of the body structures extends laterally along an axis that is perpendicular a longitudinal axis of the aircraft body.

35. The blended wing body aircraft of claim 26, wherein each of the body structures extends longitudinally along an axis that is parallel a longitudinal axis of the aircraft body.

36. The blended wing body aircraft of claim 26, wherein each of the body structures extends laterally along an axis that is perpendicular a longitudinal axis of the aircraft body.

37. A blended wing body aircraft comprising:

a pair of aircraft wings; and an aircraft body that is at least partially formed from a plurality of longitudinally-extending body structures, each of the body structures having a body structure centerline arranged parallel to a centerline of the aircraft body, each of the body structures that are positioned such that their body structure centerline is not coincident with a centerline of the aircraft body includes a tip portion that forms a portion of the leading edge of the blended wing body aircraft, the tip portion having an inner edge with a first portion that extends outwardly away from a centerline of the aircraft body and a second portion that is coupled to the first portion and extends forwardly and outwardly toward the leading edge of the blended wing body aircraft.

38. The blended wing aircraft of claim 37, wherein the aircraft body includes a uniquely constructed central one of the body structures disposed between the other body structures such that the body structure centerline of the central body structure is coincident with the centerline of the aircraft body.

39. The blended wing aircraft of claim 38, wherein the central body structure terminates at a forward edge that is generally perpendicular to the body structure centerline of the central body structure.

40. The blended wing aircraft of claim 37, wherein the aircraft body has an upper outer surface and a lower outer surface and wherein the aircraft body further comprises an upper skin assembly and a lower skin assembly, the upper and lower skin assemblies being coupled to opposite sides of the body structures and forming at least a portion of the upper and lower outer surfaces of the aircraft body.

41. A blended wing body aircraft comprising:

a pair of aircraft wings; and an aircraft body that is at least partially formed from a plurality of longitudinally-extending body structures and a pair of leading edge panels, each of the body structures having a body structure centerline, each of the body structures that are positioned such that their body structure centerline is not coincident with a centerline of the aircraft body includes a tip portion that terminates rearwardly of a leading edge of the blended wing body aircraft, each tip portion having an inner edge with a first portion that extends outwardly away from the centerline of the aircraft body, each of the leading edge panels being coupled to a portion of the body structures and one of the aircraft wings and forming at least a portion of the leading edge.

42. The blended wing aircraft of claim 41, wherein the aircraft body includes a uniquely constructed central one of the body structures disposed between the other body structures such that the body structure centerline of the central body structure is coincident with the centerline of the aircraft body.

43. The blended wing aircraft of claim 42, wherein the central body structure terminates at a forward edge that is generally perpendicular to the body structure centerline of the central body structure.

44. The blended wing body aircraft of claim 41, wherein the aircraft body has an upper outer surface and a lower outer surface and wherein the aircraft body further comprises an upper skin assembly and a lower skin assembly, the upper and lower skin assemblies being coupled to opposite sides of the body structures and forming at least a portion of the upper and lower outer surfaces of the aircraft body.

45. A blended wing body aircraft comprising:

a pair of aircraft wings; and an aircraft body at least partially formed from a plurality of body structures, each of the body structures being elongated along an axis generally perpendicular to a longitudinal axis of the aircraft.

46. The blended wing body aircraft of claim 45, wherein the aircraft body has an upper outer surface and a lower outer surface and wherein the aircraft body further comprises an upper skin assembly and a lower skin assembly, the upper and lower skin assemblies being coupled to opposite sides of the body structures and forming at least a portion of the upper and lower outer surfaces of the aircraft body.

47. The blended wing body aircraft of claim 45, wherein none of the body structures that abut a lateral surface of the aircraft wings defines a portion of a leading of the blended wing body aircraft.

* * * * *